US012643079B2

(12) United States Patent
Cheio De Oliveira

(10) Patent No.: US 12,643,079 B2
(45) Date of Patent: Jun. 2, 2026

(54) DEVICE AND ASSEMBLY FOR MIXING A BAKERY, PASTRY OR COSMETIC PREPARATION

(71) Applicant: VMI, Montaigu Vendee (FR)

(72) Inventor: José Cheio De Oliveira, St Hilaire de Loulay (FR)

(73) Assignee: VMI, Montaigu Vendee (FR)

( * ) Notice: Subject to any disclaimer, the term of this patent is extended or adjusted under 35 U.S.C. 154(b) by 789 days.

(21) Appl. No.: 17/820,984

(22) Filed: Aug. 19, 2022

(65) Prior Publication Data

US 2023/0056863 A1 Feb. 23, 2023

(30) Foreign Application Priority Data

Aug. 19, 2021 (FR) ..................................... 21 08783

(51) Int. Cl.

| | |
|---|---|
| ***B01F 27/00*** | (2022.01) |
| ***B01F 27/091*** | (2022.01) |
| ***B01F 27/1123*** | (2022.01) |
| ***B01F 27/1125*** | (2022.01) |
| ***B01F 27/84*** | (2022.01) |
| ***B01F 27/906*** | (2022.01) |
| ***B01F 35/32*** | (2022.01) |
| ***B01F 35/43*** | (2022.01) |

(Continued)

(52) U.S. Cl.

CPC ............ *B01F 27/84* (2022.01); *B01F 27/091* (2022.01); *B01F 27/1123* (2022.01); *B01F 27/11253* (2022.01); *B01F 27/906* (2022.01); *B01F 35/3214* (2022.01); *B01F 35/3231* (2022.01); *B01F 35/43* (2022.01); *B01F 35/45* (2022.01); *B01F 2101/08* (2022.01); *B01F 2101/21* (2022.01)

(58) Field of Classification Search

CPC .... B01F 27/84; B01F 2101/08; B01F 27/091; B01F 35/3214; B01F 27/1123; B01F 27/906; B01F 2101/21

See application file for complete search history.

(56) References Cited

U.S. PATENT DOCUMENTS

| | | | | |
|---|---|---|---|---|
| 4,190,371 A * | 2/1980 | Durr | B01F 27/84 | 366/139 |
| 4,428,680 A * | 1/1984 | Persson | B01F 27/0725 | 366/296 |
| 5,979,807 A * | 11/1999 | Pellicer | B01F 35/751 | 241/101.8 |

FOREIGN PATENT DOCUMENTS

| | | |
|---|---|---|
| EP | 0057673 A2 | 8/1982 |
| EP | 0323767 A1 | 7/1989 |

(Continued)

*Primary Examiner* — Anshu Bhatia

(74) *Attorney, Agent, or Firm* — CANTOR COLBURN LLP

(57) ABSTRACT

A mixing assembly and a mixing device configured to mix a bakery, pastry or cosmetic preparation includes a mixing tank configured to receive ingredients intended to be mixed to form the preparation; a first mixing tool configured to be immersed at least partially in the mixing tank and configured to mix the ingredients and/or the preparation. The first mixing tool is configured to be driven in rotation around a first axis of rotation. A second mixing tool is configured to be immersed at least partially in the mixing tank and configured to mix the ingredients and/or the preparation, the second mixing tool being configured to be driven in rotation around a second axis of rotation. The first and second axes of rotation are substantially coaxial.

12 Claims, 10 Drawing Sheets

(51) Int. Cl.

| | |
|---|---|
| ***B01F 35/45*** | (2022.01) |
| *B01F 101/08* | (2022.01) |
| *B01F 101/21* | (2022.01) |

(56) References Cited

FOREIGN PATENT DOCUMENTS

| | | | |
|---|---|---|---|
| EP | 3298899 | A1 | 3/2018 |
| FR | 2799397 | A1 | 4/2001 |

* cited by examiner

DEVICE AND ASSEMBLY FOR MIXING A BAKERY, PASTRY OR COSMETIC PREPARATION

CROSS REFERENCE TO RELATED APPLICATIONS

This application is related to and claims the benefit of French Patent Application No. 21 08783, filed on Aug. 19, 2021, the contents of which are herein incorporated by reference in their entirety.

TECHNICAL FIELD

The present disclosure relates to a device for mixing a preparation for making bakery, pastry or cosmetic products.

BACKGROUND

It is known to use mixing devices comprising a rotating tank and a rotating tool. This type of device is robust and simple to manufacture. The combination of the rotation of the tank and of the rotating tool allows, for example when kneading a preparation, a homogeneous mixture of the preparation during the pre-mixing phase, also called the blending phase, and has good structuring of the gluten network and good aeration of the preparation during the kneading phase.

Increasingly, the bakery/pastry or cosmetics sector looking to monitor the different parameters involved during kneading, for example the temperature or the atmosphere in the tank (pressure, injection of gas such as nitrogen for example), which is difficult to achieve when the tank is rotating.

There is therefore a need in this sense.

SUMMARY

The aim of this disclosure is to overcome all or part of the drawbacks mentioned hereinabove.

To this end, the present disclosure concerns a mixing device configured to mix a bakery, pastry or cosmetic preparation comprising:

- a mixing tank configured to receive ingredients intended to be mixed to form a preparation;
- a first mixing tool configured to be immersed at least partially in the mixing vessel and designed to mix the ingredients, the first mixing tool being configured to be driven in rotation around a first axis of rotation;
- a second mixing tool configured to be immersed at least partially in the mixing tank and designed to mix the ingredients, the second mixing tool being configured to be driven in rotation around a second axis of rotation, the first and second axes of rotation being substantially coaxial.

By “substantially coaxial”, it should be understood that the first and second axes of rotation may be coaxial or be laterally offset from each other by a distance of less than 20 mm.

Preferably, the first and second axes of rotation can be laterally offset from each other by a distance of less than 10 mm.

By “preparation”, it should be understood a cosmetic composition, or else a bakery or pastry preparation.

It should be understood that the mixing of the ingredients by the mixing device may comprise the kneading of a preparation in the case where the preparation is a bakery or pastry preparation.

Thus, the ingredients may be mixed by two rotational movements, which allows an optimal quality of the mixture, while keeping the tank stationary. Since the tank is not rotating, it may be closed in an airtight manner and thus the atmosphere in the tank during the mixing operation (for example the temperature, the increase in pressure or the creation of a vacuum, the presence of gas such as nitrogen in the atmosphere) may be monitored. Monitoring the atmosphere within the tank makes it possible, for example, to make different products. These arrangements also make it possible to simplify the manufacture of the mixing device.

In some embodiments, the mixing device further comprises a first drive mechanism configured to drive the first mixing tool in rotation around the first axis of rotation, and a second drive mechanism configured to drive the second mixing tool in rotation around the second axis of rotation.

Thus, the movements of the first and second mixing tools may be independent of each other, which improves the quality of the mixing of the preparation.

In some embodiments, the first mixing tool and the second mixing tool are configured to be driven in rotation in the same direction of rotation or in two opposite directions of rotation.

Thus, the quality of the mixing of the preparation is improved.

For example, the first mixing tool and the second mixing tool are configured to be driven in rotation at different rotational speeds.

For example, the first mixing tool and the second mixing tool are driven in the same direction of rotation but at different rotational speeds, which makes it possible to obtain two mixing movements and thus to improve the quality of the mixing of the preparation.

For example, if the first mixing tool is configured to be driven in rotation in a clockwise direction, the second mixing tool may be configured to be driven in rotation in a clockwise or counterclockwise direction.

In some embodiments, the first mixing tool comprises a first contact portion disposed within the mixing tank, the first contact portion comprising a first mixing part extending towards a bottom of the mixing tank, and wherein the second mixing tool comprises a second contact portion disposed within the mixing tank, the second contact portion comprises a second mixing part extending towards a bottom of the mixing tank.

The first and second mixing parts allow the preparation to be mixed.

In some embodiments, at least one of the first and second mixture parts comprises a rectilinear portion.

In some embodiments, at least one of the first and second mixing parts comprises a curved portion.

In some embodiments, at least one of the first and second mixing parts comprises a portion extending in an axial direction with respect to the first and second axes of rotation respectively.

In some embodiments, at least one of the first and second mixing parts comprises a portion inclined with respect to an axial direction with respect to the first and second axes of rotation.

For example, at least one of the first and second mixing parts comprises at least one spiral-shaped portion.

For example, at least one of the first and second mixing parts comprises at least one spiral portion-shaped portion.

For example, the first and second mixing parts are in the shape of a spiral. Thus, when the first and second mixing tools are driven in rotation, the first and second mixing parts therefore intersect in a progressive manner, which limits the shocks on the preparation. The shape of the first and second mixing parts therefore makes it possible to progressively push the preparation downwards, which makes it possible to obtain a good quality of mixture.

In some embodiments, at least one of the first and second mixing parts comprises an offset portion configured to form a passage for the preparation between the first and second mixing parts.

For example, the first and second mixing portions are eccentric with respect to the first and second axes of rotation.

For example, the first and second mixing portions are symmetrical with respect to the first and second axes of rotation.

For example, the first and second mixing portions are opposite with respect to the first and second axes of rotation.

The particular shapes of the first and second mixing parts make it possible to improve the quality of the mixing of the preparation.

In some embodiments, at least one of the first and second contact portions comprises a scraping part extending in a radial direction with respect to the first and second axes of rotation and being adjacent to the bottom of the mixing tank.

The scraping part prevents the preparation from stagnating at the bottom of the mixing tank.

In some embodiments, the mixing tank includes a discharge opening, and a discharge gate which is movably mounted between a discharge position in which the discharge gate releases the discharge opening and the content of the mixing tank may be poured out of said mixing tank through the discharge opening, and a blocking position in which the discharge gate blocks the discharge opening.

Thus, the preparation may easily be recovered on completion of a mixing and kneading operation.

For example, the discharge opening is provided on a bottom wall of the mixing tank.

For example, the discharge gate is disposed underneath the mixing tank.

In some embodiments, the first drive mechanism is configured to directly drive the first mixing tool in rotation, and the second drive mechanism is configured to directly drive the second mixing tool in rotation.

Thus, the rotational speed of the first and second mixing tools is better controlled and the actuators may be dimensioned more easily.

In some embodiments, the first mixing tool comprises a first drive portion configured to be driven in rotation around the first axis of rotation by the first drive mechanism, and the second mixing tool comprises a second drive portion, configured to be driven in rotation around the second axis of rotation by the second drive mechanism, the first drive portion being disposed around the second drive portion.

The first and second drive portions make it possible to transmit the rotational movement induced by the first and second drive mechanisms respectively to the first and second contact portions respectively.

For example, the first and second drive portions are spindles.

For example, the first contact portion is configured to be removably attached to the first drive portion, and the second contact portion is configured to be removably attached to the second drive spindle.

In some embodiments, the mixing device further includes a closure cap configured to close in an airtight manner the mixing tank.

The closure cap makes it possible to close the mixing tank in an airtight manner and thus to monitor the kneading parameters.

In some embodiments, the closure cap comprises a passage hole, the first and second drive spindles being configured to extend through said passage hole.

In some embodiments, the mixing device comprises a system for heating the mixing tank.

For example, the mixing tank comprises an inner wall and an outer wall delimiting a space therebetween. The heating system is configured to conduct a heat transfer fluid through the space and thus heat the mixing tank.

In some embodiments, the mixing device comprises a system for sucking and blowing air and/or gas into the mixing tank.

Thus, the pressure inside the mixing tank may be monitored and it is possible to inject a gas such as nitrogen into the mixing tank.

For example, the first mixing tool comprises two second parts extending towards the bottom of the mixing tank, the two second parts each having a curved shape, and a third part extending radially towards the outside of the mixing tank and connected to one of the two second parts, and the second mixing tool comprises two second parts extending towards the bottom of the mixing tank, the two second parts each having a curved shape, and a third part extending radially towards the outside of the mixing tank and connected to one of the two second parts.

For example, the curved shape of each of the two second parts of the first mixing tool extends at a constant radial distance from the first axis of rotation, and wherein the curved shape of each of the two second parts of the second mixing tool extends at a constant radial distance from the second axis of rotation.

For example, the third part of the first mixing tool comprises two upper surfaces, facing the top of the tank, for example inclined relative to each other, and a lower surface facing the bottom of the tank, the two upper surfaces and the lower surface being for example arranged such that the third part has a triangular section, and the third part of the second mixing tool comprises an upper surface, facing the top of the tank, and a lower surface facing the bottom of the tank, which are inclined according to the same inclination.

For example, the first mixing tool comprises two first parts, extending in the radial direction relative to the first and second axes of rotation outwards, each of the two first parts being connected to a respective one of the second parts of the first mixing tool, the two first parts extending in opposite manner in the radial direction, and the second mixing tool comprises two first parts, extending in the radial direction with respect to the first and second axes of rotation outwards, each of the two first parts being connected to a respective one of the second parts of the second mixing tool.

For example the mixing tank comprises a side wall having the shape of a right circular cylinder.

The present disclosure further relates to a mixing assembly comprising a mixing device in accordance with any of the aforementioned features, and a frame, the mixing tank of the mixing device being configured to be mounted on the frame, the mixing tank being stationary relative to the frame.

Thus, the mixing tank may be closed in an airtight manner and the monitoring of the atmosphere of the tank during the mixing of the preparation is improved. Since the mixing tank is stationary, the frame may also carry the kinematic elements such as the first and second drive mechanisms or an actuator for the closure cap.

BRIEF DESCRIPTION OF THE DRAWINGS

The features of the disclosure and its advantages will be better understood upon reading the detailed description made hereinafter of different embodiments of the disclosure provided as non-limiting examples. This description refers to the appended figure pages, in which.

DETAILED DESCRIPTION OF THE DRAWINGS

Figure 1:
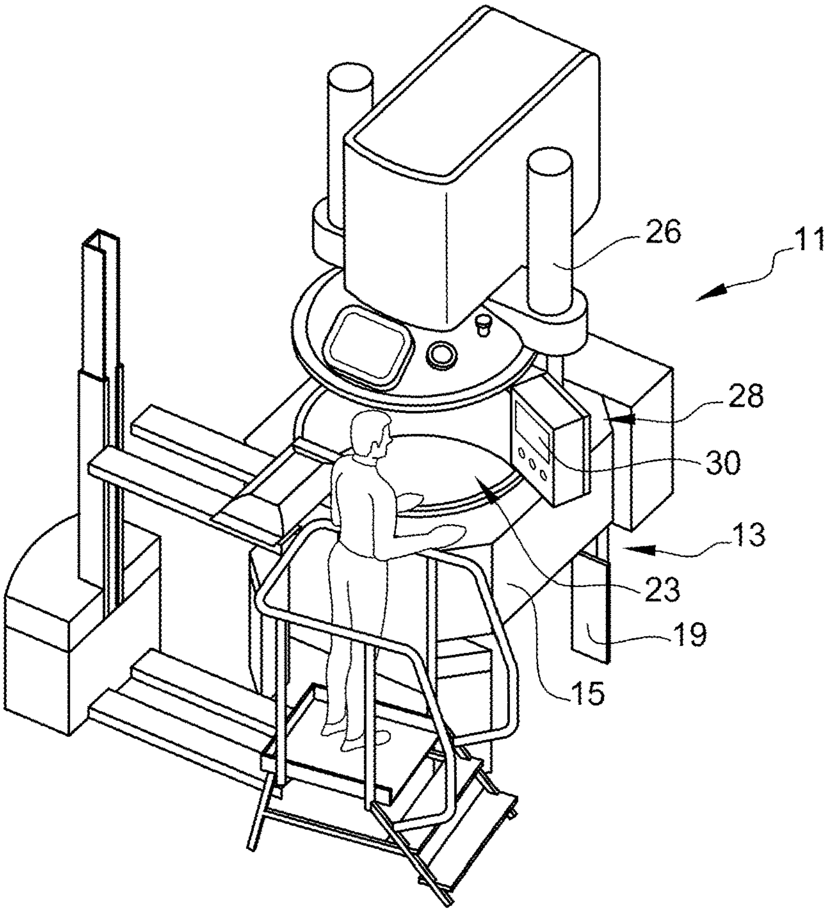
FIGS. 1 and 2 represent an exemplary embodiment of the kneading assembly.
Figure 2:
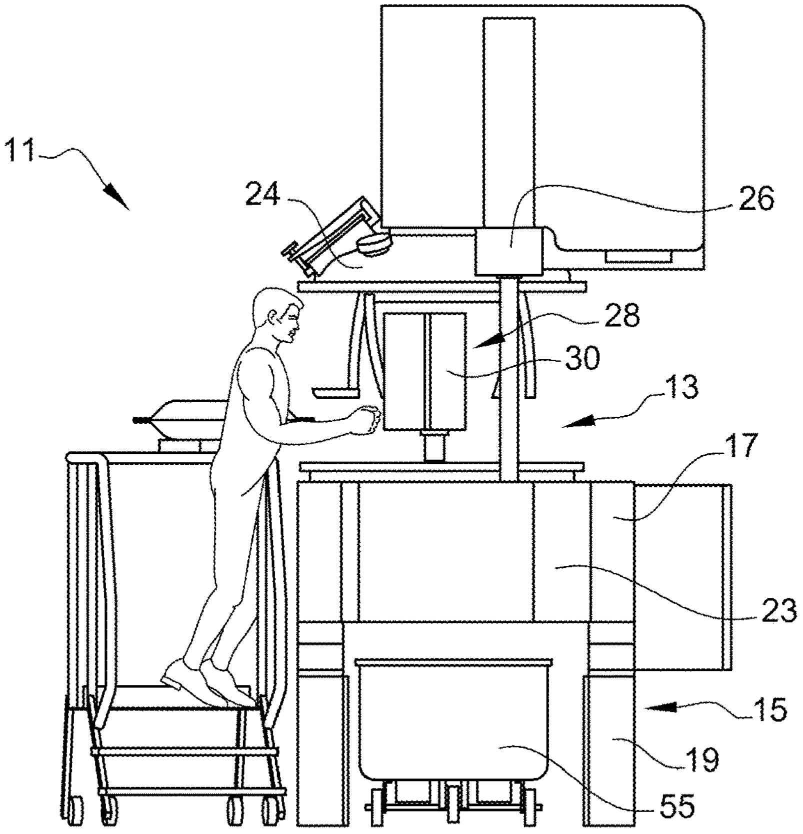

FIGS. 1 and 2 represent a mixing assembly 11 comprising a mixing device 13 of a preparation and a frame 15, on which the mixing device 13 is mounted.

Figure 3:
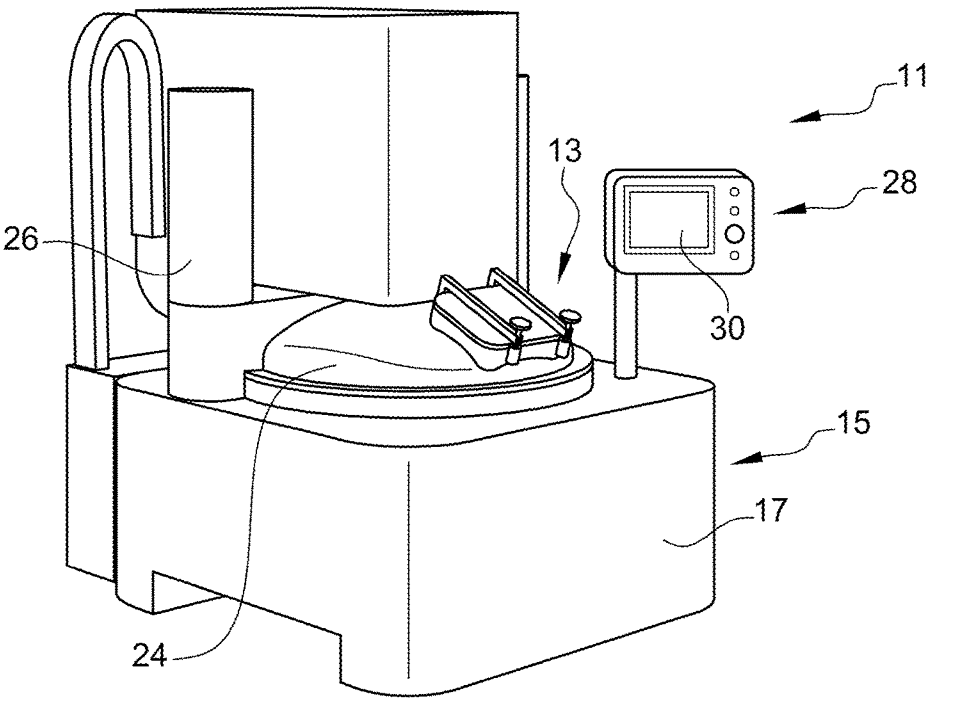
FIG. 3 represents another exemplary embodiment of the kneading assembly.
Figure 4:
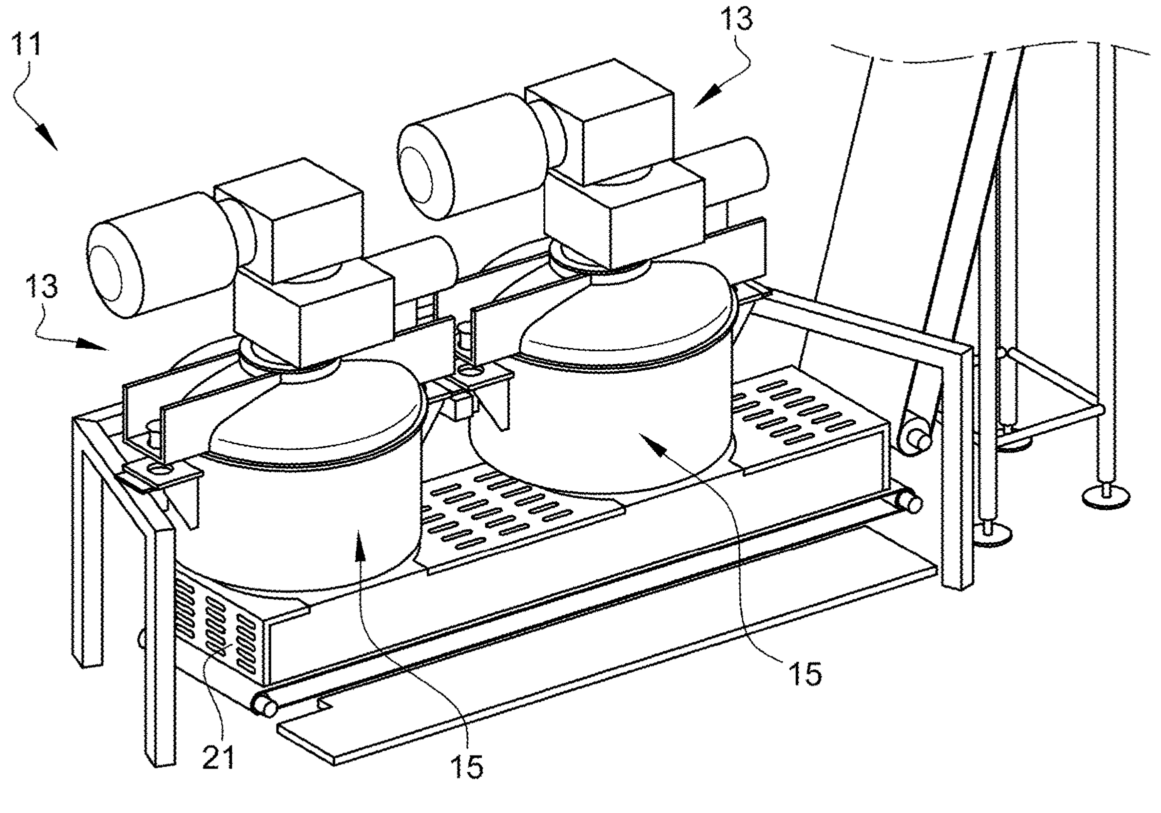
FIG. 4 represents another exemplary embodiment of the kneading assembly.

As represented in FIGS. 1 and 2, the frame may comprise a body 17 and legs 19. For example, the legs 19 are removable and may be removed, as represented in FIG. 3. Thus, the frame 15 may be mounted on a platform 21 of the mixing assembly as represented in FIG. 4. In the example of FIG. 4, the mixing assembly 11 may comprise two mixing devices 13 mounted on the platform 21.

The mixing device 13 comprises a mixing tank 23 configured to receive ingredients intended to be mixed to form a preparation. For example, the preparation may then be transformed into bakery or pastry products.

The mixing tank 23 comprises an inner wall 23*a* and an outer wall 23*b* delimiting therebetween a space 23*c*. The inner and outer walls 23*a*, 23*b* thus form a double envelope. The space 23*c* allows the circulation of a heat transfer fluid allowing the heating and/or the cooling of the mixing tank 23, and thus the variation the temperature inside the mixing tank 23. The mixing tank 23 comprises a bottom 23*d* and an opening 23*e*, opening outwards.

The mixing tank 23 may comprise a side wall defining a cylindrical inner space, for example straight cylindrical space, for example straight circular cylindrical space. The mixing device 13 may be configured such that the inner space is for example the space within which the ingredient(s) is or are received and mixed. The inner space may be defined by the side wall and the bottom 23*d*. The side wall may be formed by the inner wall 23*a*. The side wall, for example the inner wall 23*a*, may have a cylindrical shape, for example a straight cylindrical shape, for example a straight circular cylindrical shape. The bottom 23*d* may have a flat surface. The side wall, for example the inner wall 23*a* may thus for example form a wall having the shape of a cylinder, for example a right cylinder, for example a right circular cylinder. The mixing tools described hereinafter, in particular those of the fifth variant, are particularly suitable for allowing effective mixing with a mixing tank having such a cylindrical shape, in particular a straight cylindrical shape, in particular a straight circular cylindrical shape.

The side wall, for example the inner wall 23*a*, may be connected to the bottom 23*d*, for example by means of an edge or a smooth transition, for example a fillet. Such a smooth transition, for example such a fillet, allows more efficient coordination with the mixing tools described hereinbelow, in particular those of the fifth variant. Such a smooth transition, for example a fillet, thus makes it possible to prevent ingredients from aggregating at this point. Such a smooth transition, for example a fillet, further facilitates the cleaning of the mixing tank 23.

The mixing device 13 further comprises a first mixing tool 25 and a second mixing tool 27 which are configured to be immersed at least partially into the mixing tank 23 and designed to mix the ingredients, then to mix the preparation.

The first mixing tool 25 comprises a first contact portion 29, configured to be in contact with the preparation in order to mix it then mix it during a mixing operation. The first contact portion 29 is configured to be disposed within the mixing tank 23 during a mixing operation. The first mixing tool 25 further comprises a first drive portion 31, secured to the first contact portion 29.

Figure 5:
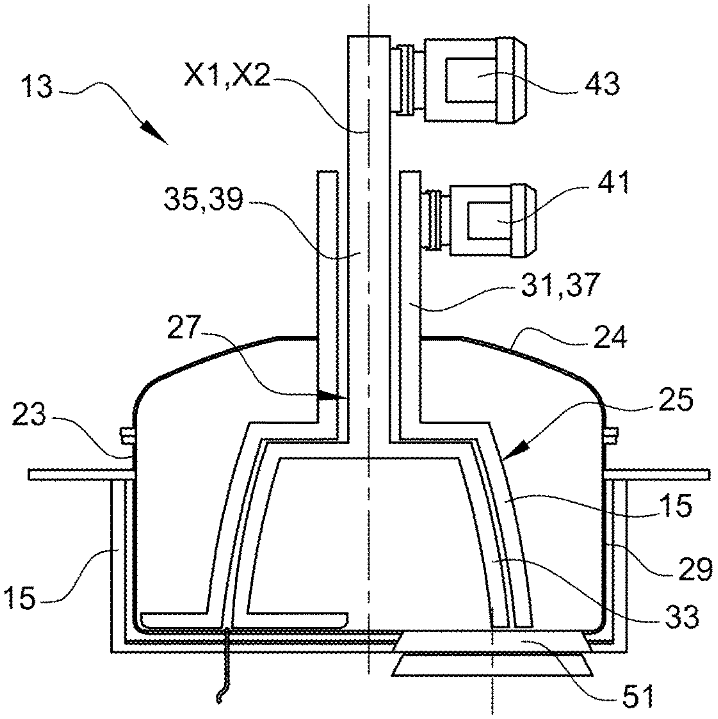
FIG. 5 represents a section of the kneading device

As represented in FIG. 5, for example, the first contact portion 29 is formed with the first drive portion 31. In other words, the first contact portion 29 is integral with the first drive portion 31.

Figure 6:
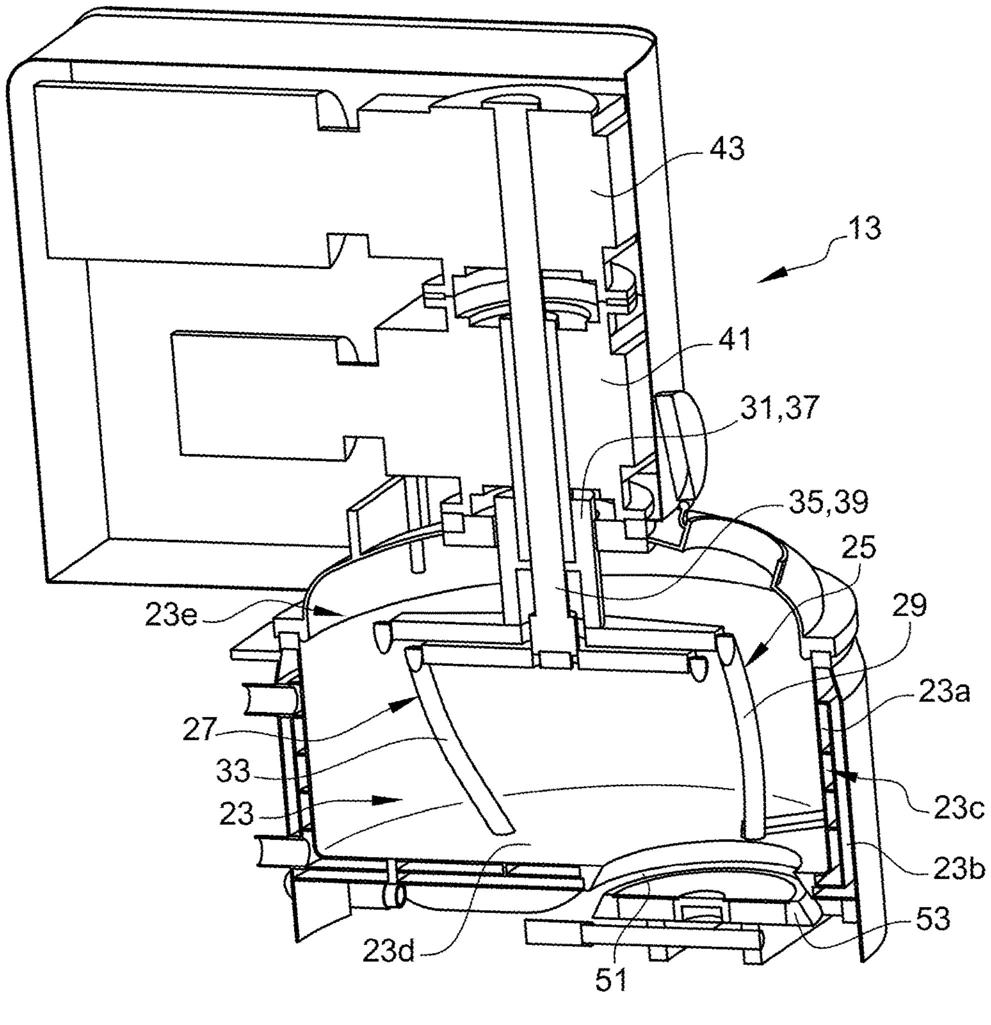
FIG. 6 represents the kneading device.
Figure 7:
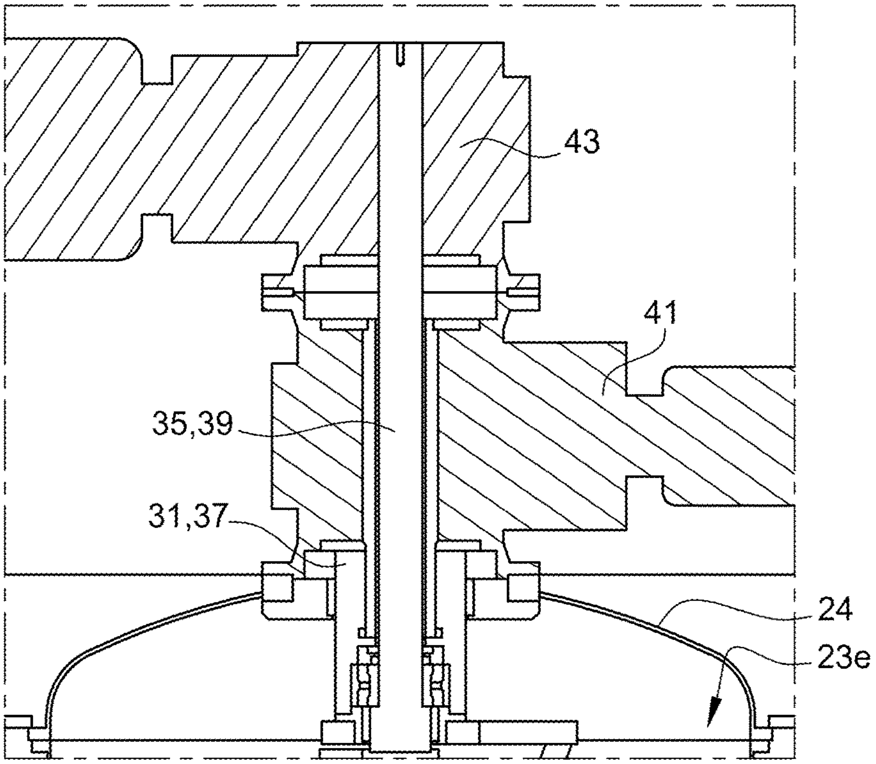
FIG. 7 represents a section of the kneading device.

As represented in FIGS. 6 and 7, for example, the first drive portion is a spindle, called “first spindle” 37. The first contact portion 29 is mounted on the first spindle 37 and is securely moving with the first spindle 37.

The second mixing tool 27 comprises a second contact portion 33, configured to be in contact with the preparation in order to mix it and then mix it during a mixing and kneading operation. The second contact portion 33 is configured to be in the mixing tank 23 during a mixing and kneading operation. The second mixing tool 27 further comprises a second drive portion 35, secured to the second contact portion 33.

As represented in FIG. 5, for example, the second contact portion 33 is formed with the second drive portion 35. In other words, the second contact portion 33 is integral with the second drive portion 35.

As represented in FIGS. 6 and 7, for example, the second drive portion is a spindle, called “second spindle” 39. The second contact portion 33 is mounted on the second spindle 39 and is securely moving with the second spindle 39.

The first mixing tool 25 is configured to be driven in rotation around a first axis of rotation X1. The second mixing tool 27 is configured to be driven in rotation around a second axis of rotation X2, the first and second axes of rotation X1, X2 being substantially coaxial. Thus, the first and second mixing tools 25, 27 are each movable and the mixing tank 23 may therefore remain stationary relative to the frame 15.

Thus, the first drive portion 31 is disposed around the second drive portion 35. The first drive portion 31 therefore has, herein, a cylinder shape. The second drive portion 35 has, herein, the shape of a tree. The inner diameter of the first drive portion 31 is therefore greater than the diameter of the second drive portion 35.

The mixing device 11 further comprises a first drive mechanism 41 configured to drive the first mixing tool 25 in rotation around the first axis of rotation X1, and a second drive mechanism 43 configured to drive the second mixing tool 27 in rotation around the second axis of rotation X2.

The first and second mixing tools 25, 27 are movable independently of each other. In other words, for example, the direction of rotation and/or the rotational speed of the first mixing tool 25 may be different from the direction of rotation and/or the rotational speed of the second mixing tool 27. The first mixing tool 25 and the second mixing tool 27 can be configured to be driven in rotation in the same direction of rotation or in two opposite directions of rotation. For example, the first mixing tool 25 may be configured to be driven in rotation in a clockwise direction of rotation, and the second mixing tool 27 can be configured to be driven in rotation in a clockwise or counterclockwise direction of rotation.

In the embodiment represented in FIGS. 5, 6 and 7 for example, the first drive mechanism 41 is configured to directly drive the first mixing tool 25 and the second drive mechanism 43 is configured to drive directly the second mixing tool 27. This makes it possible to control the force transmitted to the first and second drive portions 31, 35 and to obtain a better yield.

According to another embodiment, the first and second drive mechanisms 41, 43 may not be directly connected to the first and second mixing tools 25, 27 respectively and comprise transmissions with pulley(s) and/or belt(s).

The first and second contact portions 29, 33 of the first and second mixing tools 25, 27 have a complementary shape, so as to prevent the first and second contact portions 29, 33 from colliding when the first and second mixing tools 25, 27 are driven in rotation.

The first and second mixing tools 25, 27 and in particular the first and second contact portions 29, 33 are represented in FIGS. 8 to 13*b*.

The first and second mixing tools 25, 27 are configured to allow mixing of the ingredients and an optimal mixing of the preparation. In other words, the first and second contact portions 29, 33 each have a particular shape, for example to prevent the ingredients or the preparation from stagnating during mixing or kneading, or to prevent the preparation from rising, overflow or splash.

For example, the first and second contact portions 29, 33 of the first and second mixing tools 25, 27 may each comprise at least a first part 45, 45' extending in a radial direction with respect to the first and second axes of rotation X1, X2, outwards with respect to the first and second axes of rotation X1, X2 respectively, from the first or the second drive portion, respectively. The first part therefore extends in an upper part of the mixing tank 23. The first part may be substantially rectilinear, or curved. Here, the first parts 45, 45' extend in opposite directions with respect to the first and second axes of rotation X1, X2. Here, the first parts 45, 45' are symmetrical with respect to the first and second axes of rotation X1, X2.

The first and second contact portions 29, 31 of the first and second mixing tools 25, 27 may each comprise a second part 47, 47' extending, from the first part, towards the bottom of the tank. The second part 47, 47' can be rectilinear or curved. The second part 47, 47' may extend in an axial direction with respect to the first and second axes of rotation X1 and X2, or else be inclined with respect to the axial direction, in one or several directions. The second part 47 of the first contact portion 29 may also be called first mixing part 47. The second part 47' of the second contact portion 33 may also be called second mixing part 47'. The second parts 47, 47' can be symmetrical with respect to the first and second axes of rotation X1, X2.

At least one of the first and second contact portions 29, 33 of the first and second mixing tools 25, 27 may comprise a third part 49, 49', which may also be called scraping part 49, 49', extending from the second part 47, 47' in the radial direction, or inclined with respect to the radial direction, towards the outside or the inside of the mixing tank 23. The third part 49, 49' may be rectilinear or curved.

Figure 8:
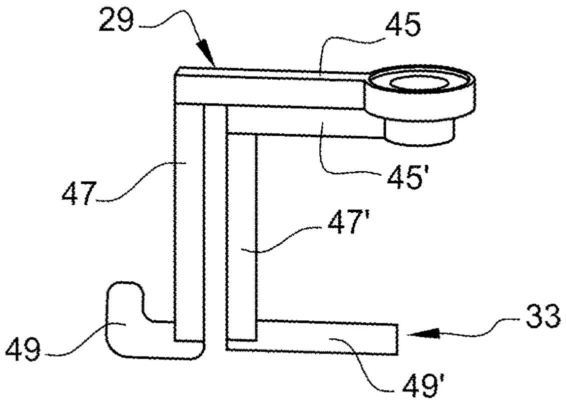
FIG. 8 represents a first variant of the first and second contact portions.

A first variant of the first and second mixing tools 25, 27 is represented in FIG. 8. The first contact portion 29 comprises a first rectilinear part 45, extending in the radial direction outwards, a second rectilinear part 47 extending in the axial direction towards the bottom of the mixing tank 23 and a third curved part 49, extending generally radially outwards and the end of which extends towards the top of the mixing tank 23. The second contact portion 33 comprises a first rectilinear part 45' extending in the radial direction outwards, a second part 47' extending axially towards the bottom of the mixing tank, and a third part 49' extending in the radial direction outwards. The first part 45 of the first contact portion 29 and the first part 45' of the second contact portion 33 are disposed at a distance in the axial direction so as to allow rotation of the tools in an opposite direction. The second part 47 of the first contact portion 29 and the second part 47' of the second contact portion 33 are disposed at a distance in the radial direction.

Figure 9:
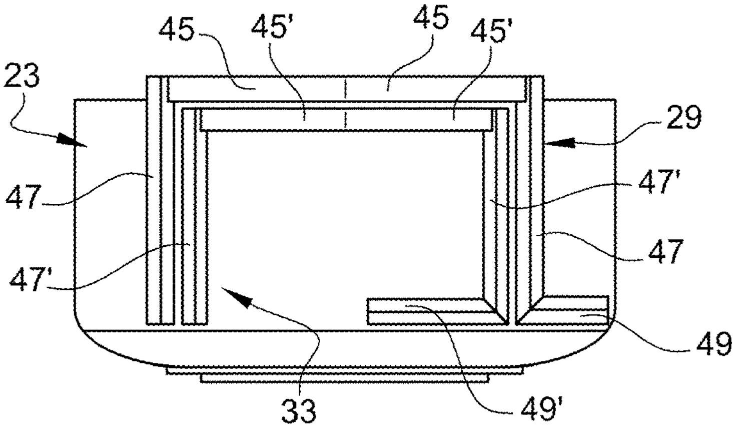
FIG. 9 represents a second variant of the first and second contact portions.

A second variant of the first and second mixing tools 25, 27 is represented in FIG. 9. The second variant differs from the first variant in that the first contact portion 29 comprises two first parts 45, extending oppositely in the radial direction. The first contact portion 29 comprises two second parts 47 extending in the axial direction towards the bottom of the mixing tank 23, each being connected to one of the first parts 45. The first contact portion 29 comprises a third part 49 extending radially outwards and connected to one of the second parts 47. The second contact portion 33 comprises two first parts 45', extending oppositely in the radial direction. The second contact portion 33 comprises two second parts 47' extending in the axial direction towards the bottom of the mixing tank 23, each being connected to one of the first parts 45'. The second contact portion 33 comprises a third part 49' extending radially inwards and connected to one of the second parts 47'.

Figure 10:
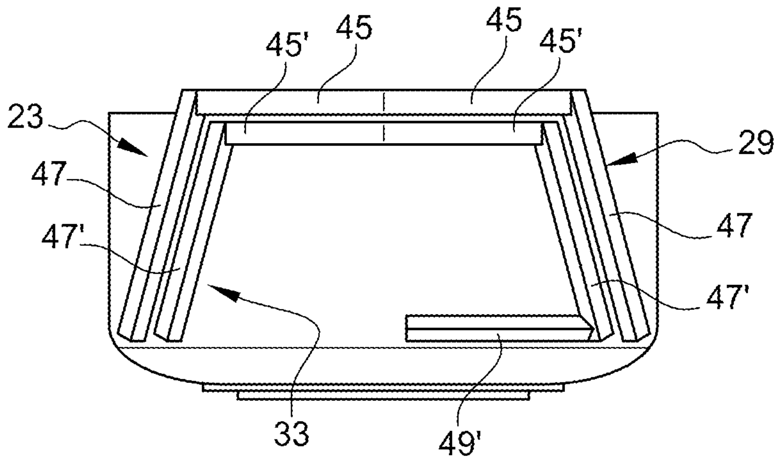
FIG. 10 represents a third variant of the first and second contact portions.

A third variant of the first and second mixing tools 25, 27 is represented in FIG. 10. The third variant differs from the second variant in that the second parts 47, 47' of the first contact portion 29 and the second contact portion 33 are inclined from the first parts 45, 45', towards the bottom of the mixing tank 23 outwards.

Figure 11A:
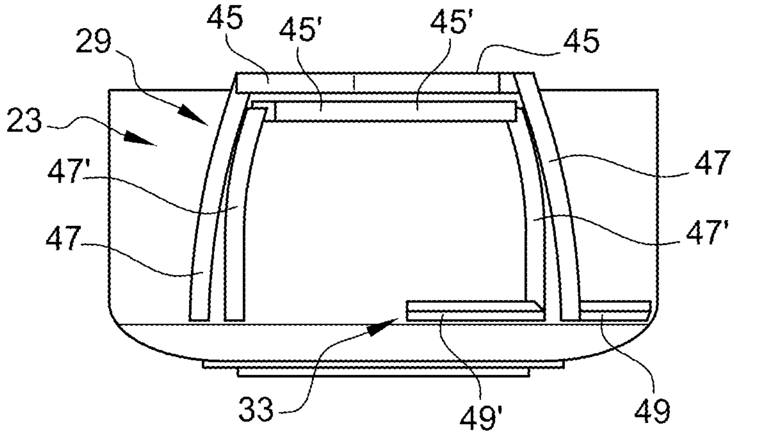
FIGS. 11*a* and 11*b* represents a fourth variant of the first and second contact portions.
Figure 11B:
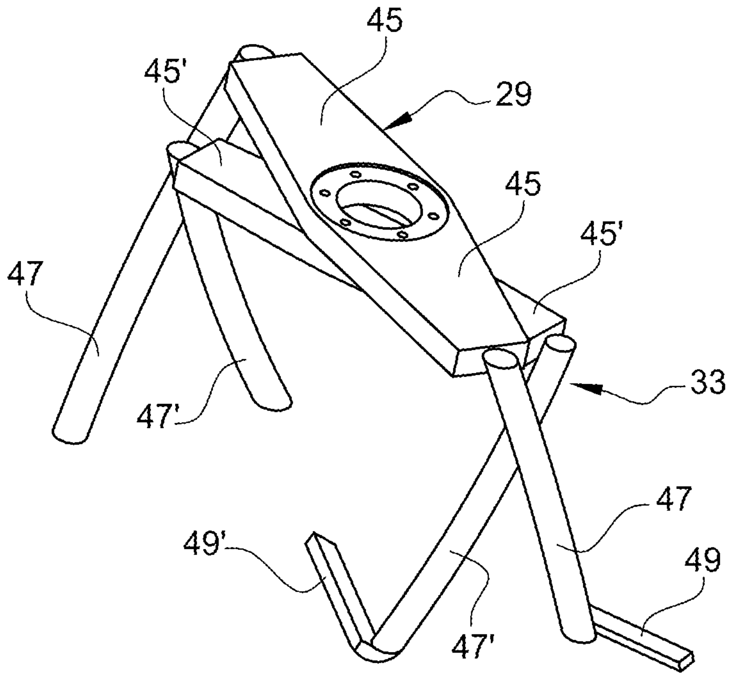

A fourth variant of the first and second mixing tools 25, 27 is represented in FIGS. 11*a* and 11*b*. This fourth variant differs from the third variant in that the second parts 47, 47' of the first contact portion 29 and of the second contact portion 33 are inclined from the first parts 45, 45', towards the bottom of the mixing tank 23 in several directions.

Figure 12A:
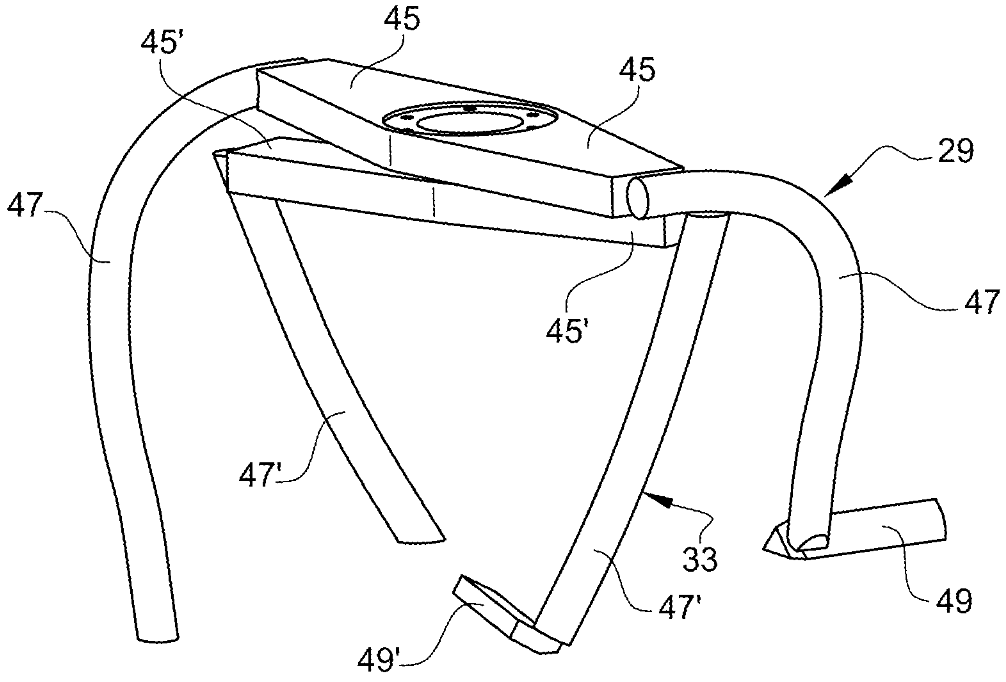
FIGS. 12*a* and 12*b* represent a fifth variant of the first and second contact portions.
Figure 12B:
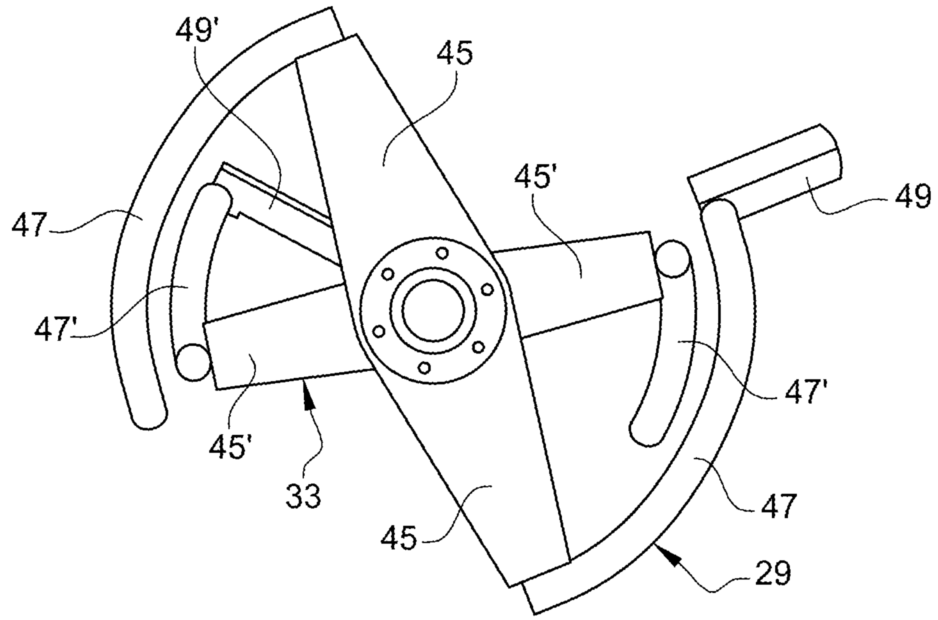

A fifth variant of the first and second mixing tools 25, 27 is represented in FIGS. 12*a* and 12*b*. This fifth variant differs from the fourth variant in that the second parts 47, 47' of the first contact portion 29 and of the second contact portion 33 are curved. The second parts 47, 47' have, here, each the shape of a coil. When the first and second mixing tools are driven in rotation, the second parts 47, 47' therefore intersect in a progressive manner, which limits the shocks on the preparation. The shape of the second parts 47, 47' therefore makes it possible to progressively push the preparation downwards, which makes it possible to obtain a good quality of mixture.

FIGS. 16*a* to 16*d* represent several side views of the mixing tank and of the fifth variant of the first and second contact portions according to different angular positions of the first and second contact portions.

First Contact Portion

According to the fifth variant, the first mixing tool 25, for example the first contact portion 29, may comprise the two first parts 45 and the two second parts 47 and the third part 49.

The first first part 45, for example rectilinear part, may extend in the radial direction with respect to the first and second axes of rotation X1, X2 outwards, for example from a central portion of the first first part 45 towards a distal portion of the first first part 45. The section of the first first part 45, for example rectangular part, may for example decrease from its central portion towards its distal portion. The first first part 45 may comprise an upper surface, a lower surface, for example of frustoconical shapes, connected by two side walls and a distal wall, the distal wall connecting the two side walls.

The first second part 47 may be connected to the first first part 45 and extend towards the bottom of the mixing tank 23. The first second part 47 may thus comprise a proximal portion, in contact with the distal portion of the first first part 45, and a distal portion, the first second part 47 extending towards the bottom of the mixing tank 23 from its proximal portion towards its distal portion. The first second part 47 may have a curved shape, for example a tubular shape, for example a circular section shape, extending from its proximal portion to its distal portion. A side wall of the proximal portion of the first second part 47 may for example be in contact with a side wall of the distal portion of the first first part 45. In particular, the curved shape of the first second part 47 extends on a constant radial distance from the axis of rotation X1. The curved shape may be configured so as to extend so as to pass, from the proximal portion extending in a first horizontal direction and/or orthogonal to the axis X1 and/or orthogonal to the radial direction in the cylindrical frame of reference associated with the axis X1, for example a first tangential direction in the cylindrical frame of reference associated with the axis X1, to the distal portion extending in a second vertical direction and/or parallel to the axis X1 and/or orthogonal to the radial direction in the cylindrical frame of reference associated with the axis X1, for example different from the first direction. The first second part may thus have a rounded, in particular concave, shape seen from above when the first mixing tool is in the operating position. Such a shape makes it possible to push ingredients, for example a paste, downwards.

By "vertical direction" it should be understood for example a direction parallel to the gravity vector when the mixing device is in the operating position. By "horizontal direction" it should be understood for example a direction orthogonal to the gravity vector when the mixing device is in the operating position.

The second first part 45, for example rectilinear part, may extend in the radial direction relative to the first and second axes of rotation X1, X2 outwards, for example from a central portion of the second first part 45 towards a distal portion of the second first part 45. The section of the second first part 45, for example rectangular, may for example decrease from its central portion towards its distal portion. The second first part 45 may comprise an upper surface, a lower surface, for example of frustoconical shapes, connected by two side walls and a distal wall, the distal wall connecting the two side walls.

The first first part 45 and the second first part 45 may for example extend oppositely in the radial direction, for example at their respective central portions.

The second second part 47 may be connected to the second first part 45 and extend towards the bottom of the mixing tank 23. The second second part 47 may thus comprise a proximal portion, in contact with the distal portion of the second first part 45, and a distal portion, the second second part 47 extending towards the bottom of the mixing tank 23 from its proximal portion towards its distal portion. The second second part 47 may have a curved shape, and for example a tubular shape, for example of a circular section shape, extending from its proximal portion to its distal portion. A side wall of the proximal portion of the second second part 47 can for example be in contact with a side wall of the distal portion of the second first part 45. In particular, the curved shape of the second second part 47 can extend at a constant radial distance from the axis of rotation X1. The curved shape may be configured so as to extend so as to pass, from the proximal portion extending in a first horizontal direction and/or orthogonal to the axis X1 and/or orthogonal to the radial direction in the cylindrical frame of reference associated with the axis X1, for example a first tangential direction in the cylindrical frame of reference associated with the axis X1, to the distal portion extending in a second vertical direction and/or parallel to the axis X1 and/or orthogonal to the radial direction in the cylindrical frame of reference associated with the axis X1, for example different from the first direction. The second second part may thus have a rounded, in particular concave shape seen from above when the first mixing tool is in the operating position. Such a shape makes it possible to push ingredients, for example a paste, downwards.

The first mixing tool 25, for example the first contact portion 29, may comprise the third part 49 extending, for example radially, towards the outside of the mixing tank 23 and connected to the first second part 47. The third part 49 may thus comprise a proximal portion, in contact with the distal portion of the first second part 47, and a distal portion, the third part 49 extending outwardly from its proximal portion towards its distal portion. The third part 49 may comprise two upper surfaces, facing the top of the tank, for example inclined relative to each other, and a lower surface facing the bottom of the tank, one or both of the two upper surfaces being inclined according to an orientation different from the vertical and the horizontal, the two upper surfaces and the lower surface being for instance arranged such that the third part 49 presents a triangular section. For example, an end wall, corresponding for example to a tubular section, of the distal portion of the first second part 47 may be in contact with one of the two upper surfaces of the third part 49, for example so as to maintain free the other upper surface of the third part 49. Such a third part 49 forms an effective scraper in both directions of rotation. The second second part 47 may not be connected to any third part 49 extending radially outwards, the distal portion of the second second part 47 forming for example a free end. The first contact portion 29 may thus comprise such a single third part 49.

Second Contact Portion

According to the fifth variant, the second mixing tool 27, for example the the second contact portion 33, may comprise the two first parts 45' and the two second parts 47' and the third part 49'.

The first first part 45', for example a rectilinear part, may extend in the radial direction with respect to the first and second axes of rotation X1, X2 outwards, for example from a central portion of the first first part 45' towards a distal portion of the first first part 45'. The section of the first first part 45', for example rectangular, may for example decrease from its central portion towards its distal portion. The first first part 45' may comprise an upper surface, a lower surface, for example of frustoconical shapes, connected by two side walls and a distal wall, the distal wall connecting the two side walls.

The first second part 47' may be connected to the first first part 45' and may extend towards the bottom of the mixing tank 23. The first second part 47' can thus comprise a proximal portion, in contact with the distal portion of the first first part 45', and a distal portion, the first second part 47' extending towards the bottom of the mixing tank 23 from its proximal portion towards its distal portion. The first second part 47' may have a curved shape, and for example a tubular shape, for example of a circular section shape, extending from its proximal portion to its distal portion. A side wall of the proximal portion of the first second part 47' may for example be in contact with a side wall of the distal portion of the first first part 45'. In particular, the curved shape of the first second part 47' may extend at a constant radial distance from the axis of rotation X2. The curved shape may be a helix shape, for example a circular helix with respect to a cylinder of revolution having the axis of rotation X2 as its axis.

The second first part 45', for example a rectilinear part, may extend in the radial direction with respect to the first and second axes of rotation X1, X2 outwards, for example from a central portion of the second first part 45' towards a distal portion of the second first part 45'. The section of the second first part 45', for example rectangular, may for example decrease from its central portion towards its distal portion. The second first part 45' may comprise an upper surface, a lower surface, for example of frustoconical shapes, connected by two side walls and a distal wall, the distal wall connecting the two side walls.

The first first part 45' and the second first part 45' may for example extend oppositely in the radial direction, for example at their respective central portions.

The second second part 47' may be connected to the second first part 45' and extend towards the bottom of the mixing tank 23. The second second part 47' may thus comprise a proximal portion, in contact with the distal portion of the second first part 45', and a distal portion, the second second part 47' extending towards the bottom of the mixing tank 23 from its proximal portion towards its distal portion. The second second part 47' may have a curved shape, and for example tubular, for example of circular section, extending from its proximal portion to its distal portion. A side wall of the proximal portion of the second second part 47' may for example be in contact with a side wall of the distal portion of the second first part 45'. In particular, the curved shape of the second second part 47' may extend at a constant radial distance from the axis of rotation X2. The curved shape may be a helix shape, for example a circular helix with respect to a cylinder of revolution having the axis of rotation X2 as its axis.

The second mixing tool 27, for example the second contact portion 33, may comprise the third part 49' extending radially towards the inside of the mixing tank 23 and connected to the first second part 47'. The third part 49' may thus comprise a proximal portion, in contact with the distal portion of the first second part 47', and a distal portion, the third part 49' extending outwards from its proximal portion towards its distal portion. The third part 49' may comprise an upper surface, facing the top of the tank, and a lower surface facing the bottom of the tank, one or both of the upper and lower surfaces being inclined according to an orientation different from the vertical and the horizontal, for example according to the same inclination. The upper surface and the lower surface are for example of rectangular shapes and connected by side surfaces. For example, an end wall, corresponding for example to a tubular section, of the distal portion of the first second part 47' may be in contact with the upper surface of the third part 49', for example so as to keep the lower surface of the third part 49' free. Such a third part 49' forms an effective scraper regardless of the direction of rotation. This simplifies the control of the device because it is not necessary to control the second mixing tool 27 to actuate it according to the two directions of rotation, for example during a kneading operation. The second second part 47' may not be connected to any third part 49' extending radially inwards, the distal portion of the second second part 47' forming for example a free end. The second contact portion 33 can thus comprise such a single third part 49'.

Such mixing tools according to the fifth variant are particularly suitable for operation with the mixing tank of cylindrical shape, in particular right circular cylindrical, as described hereinabove.

Figure 13A:
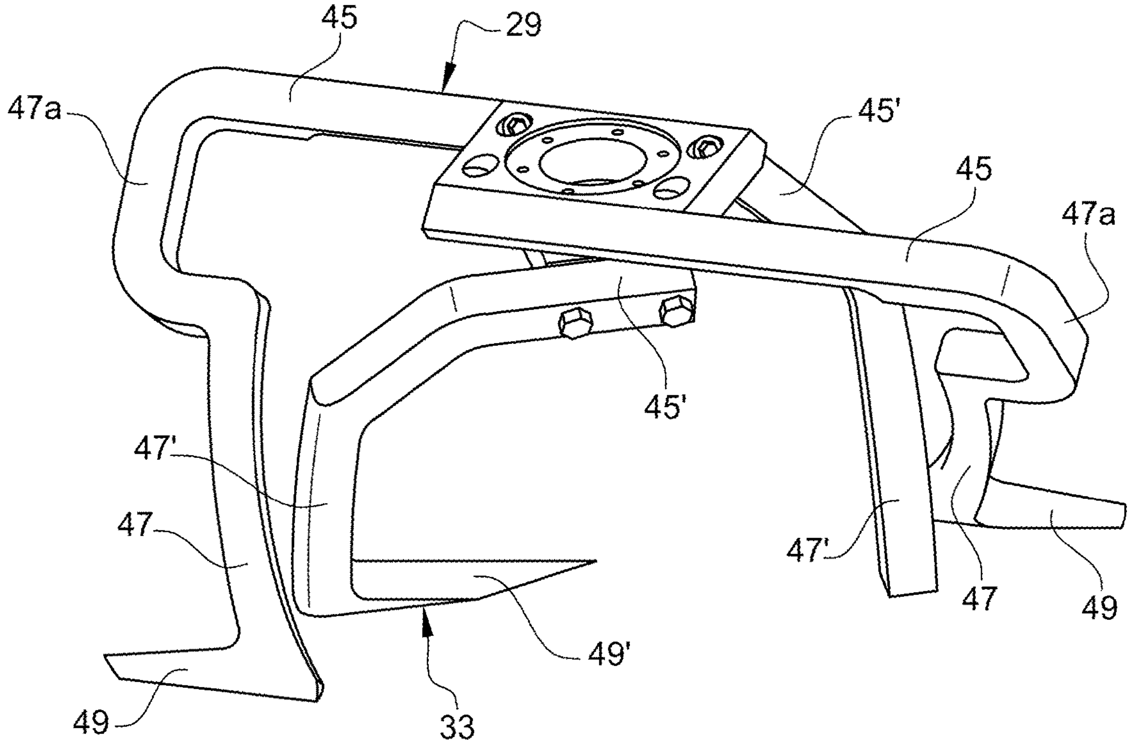
FIGS. 13*a* and 13*b* represent a sixth variant of the first and second contact portions.
Figure 13B:
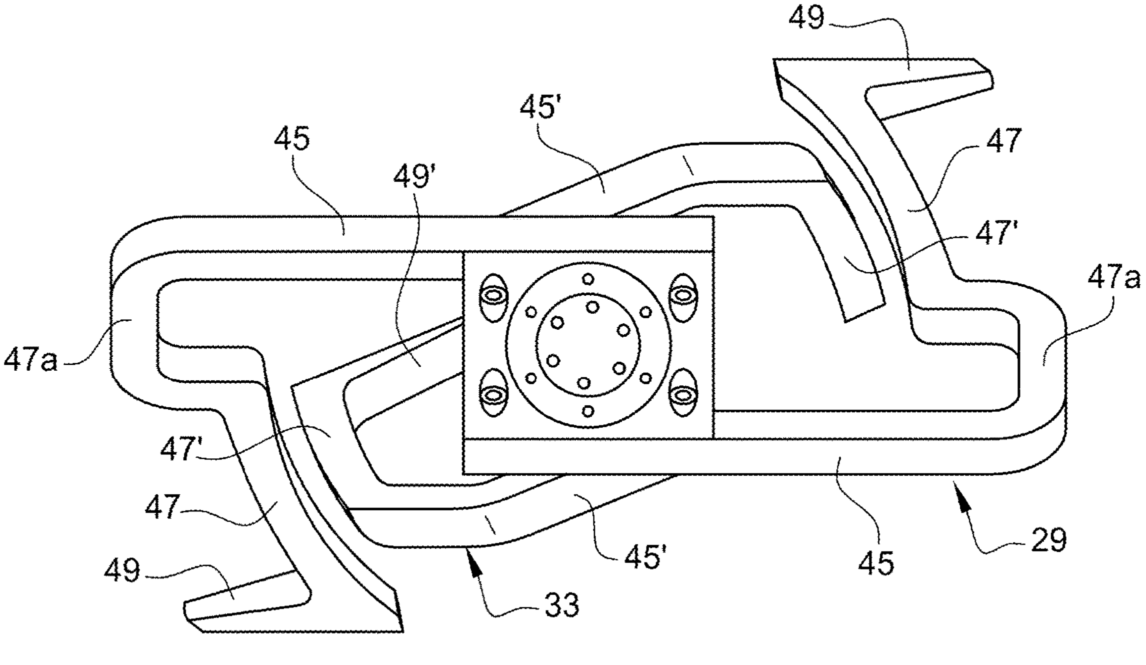

A sixth variant of the first and second mixing tools 25, 27 is represented in FIGS. 13*a* and 13*b*. This sixth variant differs from the fifth variant in that the second parts 47 of the first contact portion 29 each comprise an offset portion 47*a*. For example, at least one of the offset portions 47*a* is offset radially outwards. For example, at least one of the offset portions 47*a* could be offset axially upwards or else according to a radial component and an axial component. Herein, the offset portions 47*a* are located in the extension of the first parts 45 of the first contact portion 29. Herein, the offset portions 47*a* have a C-shape opening towards the second parts 47' of the second contact portion 33. By example, the second parts 47 of the first contact portion 29 comprise, in the extension of the offset portions 47*a*, a portion extending towards the bottom of the mixing tank 23. The offset portions 47*a* make it possible to create a passage for the preparation between the first and second contact portions 29, 33 and to prevent the preparation from stagnating.

The mixing device 13 comprises a closure cap 24 configured to close the mixing tank 23 during operations of mixing of a preparation. The closure cap 24 is configured to close the opening 23*e* of the mixing tank 23 in a sealed and airtight manner so as to allow monitoring the mixing conditions inside the mixing tank 23, such as the pressure or the temperature inside the mixing tank 23.

The closure cap 24 may be actuated by an actuator 26 comprising, for example, cylinders. For example, in FIGS. 1 and 2, the closure cap 24 is raised and the mixing tank 23 is open. For example, in FIGS. 3, 4 and 5, the closure cap 24 closes the mixing tank 23.

Figure 14:
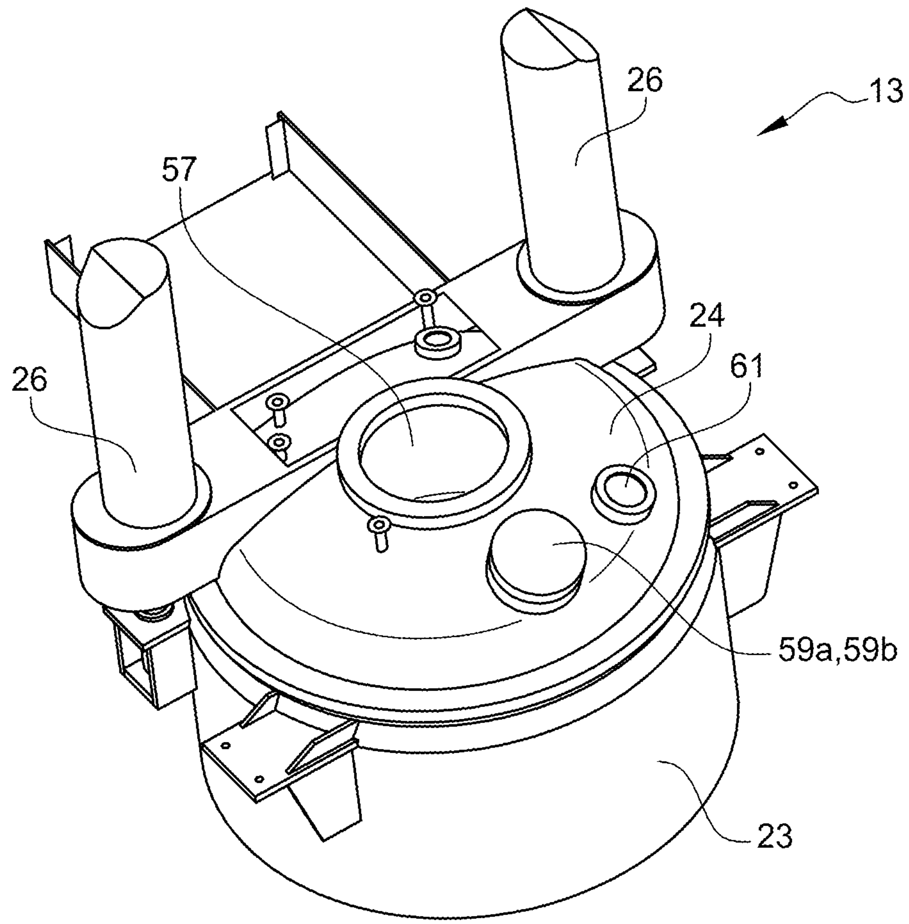
FIG. 14 represents the mixing device seen from above, in which the mixing tank is closed by the closure cap.

As represented in FIG. 14, the closure cap 24 comprises a passage hole 57 of the first and second mixing tools 25, 27. The first and second mixing tools 25, 27 are therefore configured to extend through the passage hole 57. The passage hole 57 is closed in an airtight manner around the first and second mixing tools 25, 27.

Figure 15:
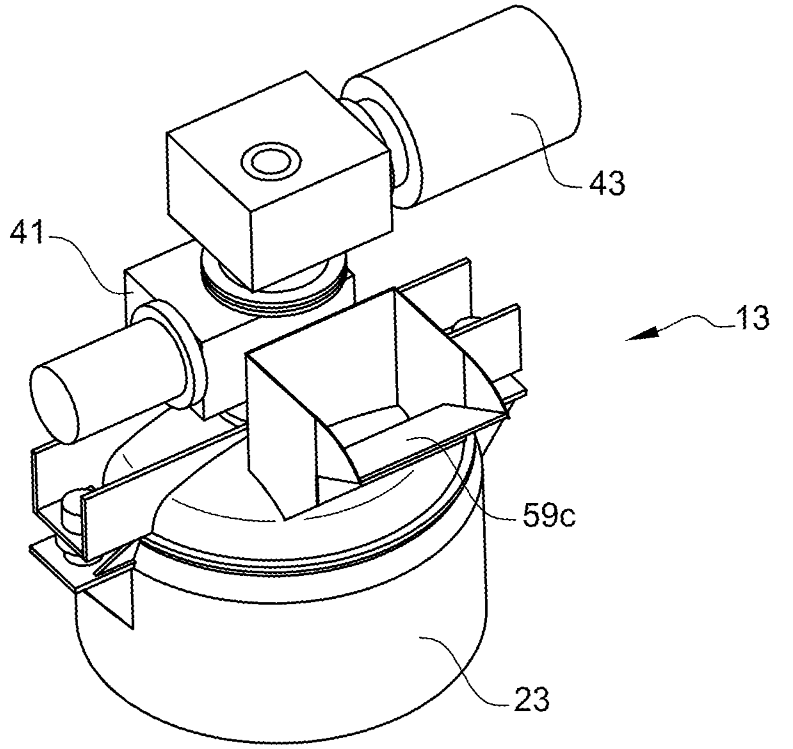
FIG. 15 represents the kneading device, in which the mixing tank is closed by the closure cap.
Figure 16A:
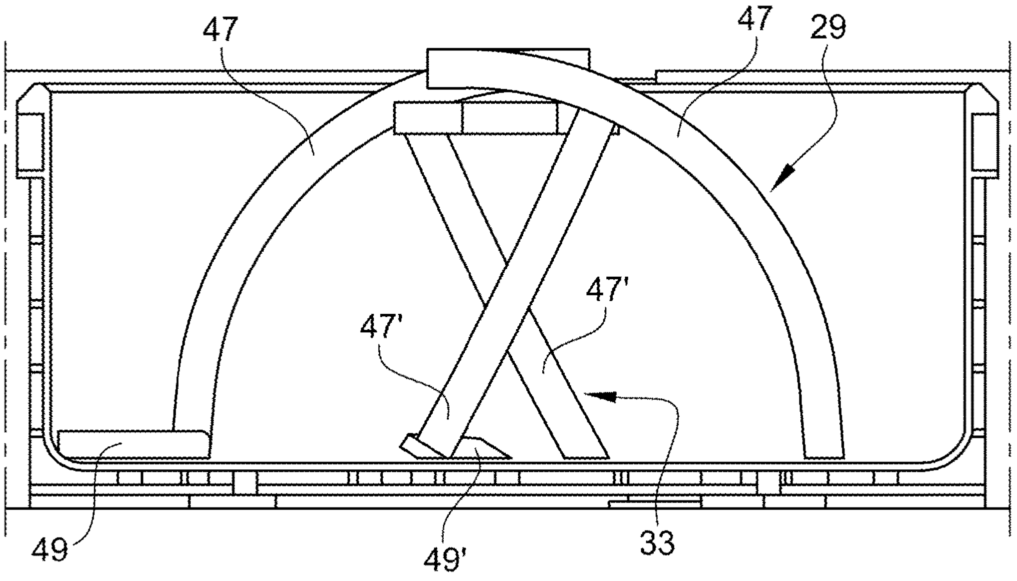
FIGS. 16*a* to 16*d* represent several side views of the mixing tank and of the fifth variant of the first and second contact portions according to different angular positions of the first and second contact portions.
Figure 16B:
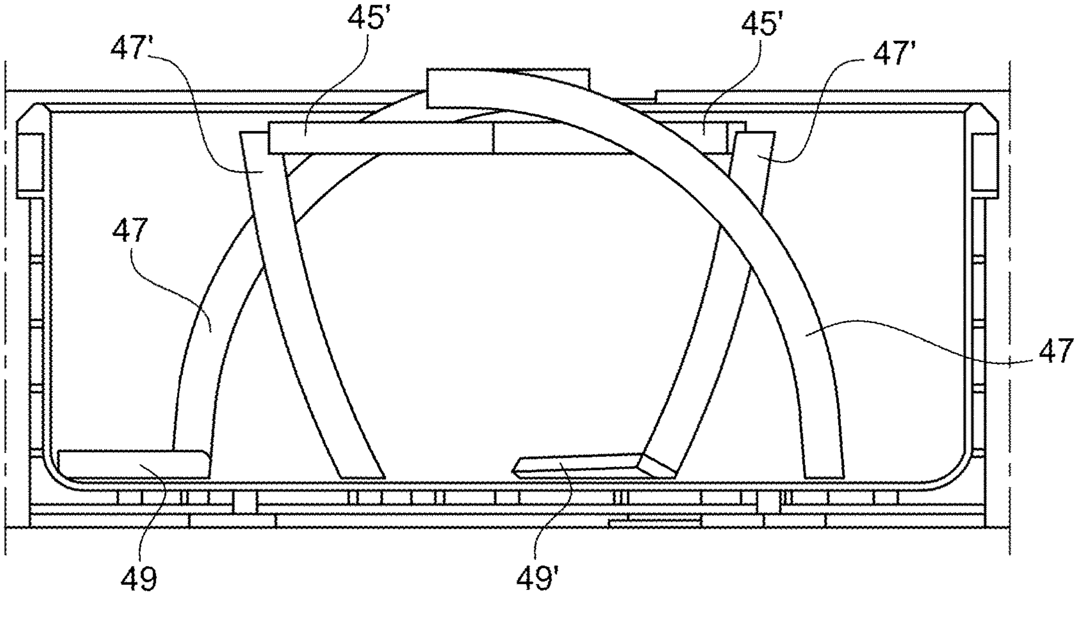
Figure 16C:
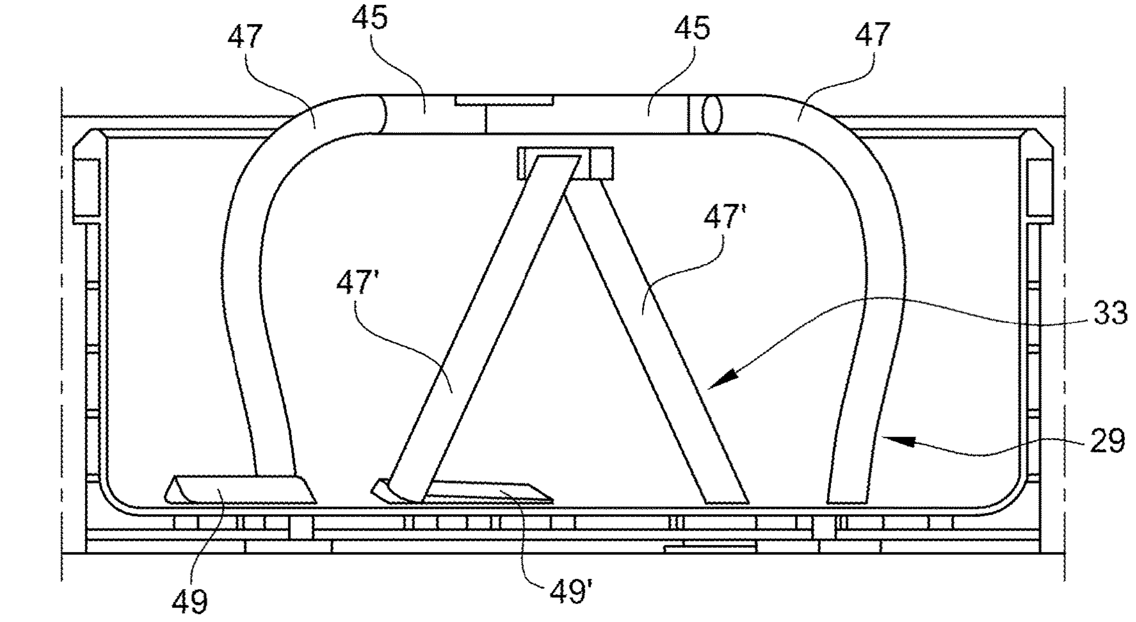
Figure 16D:
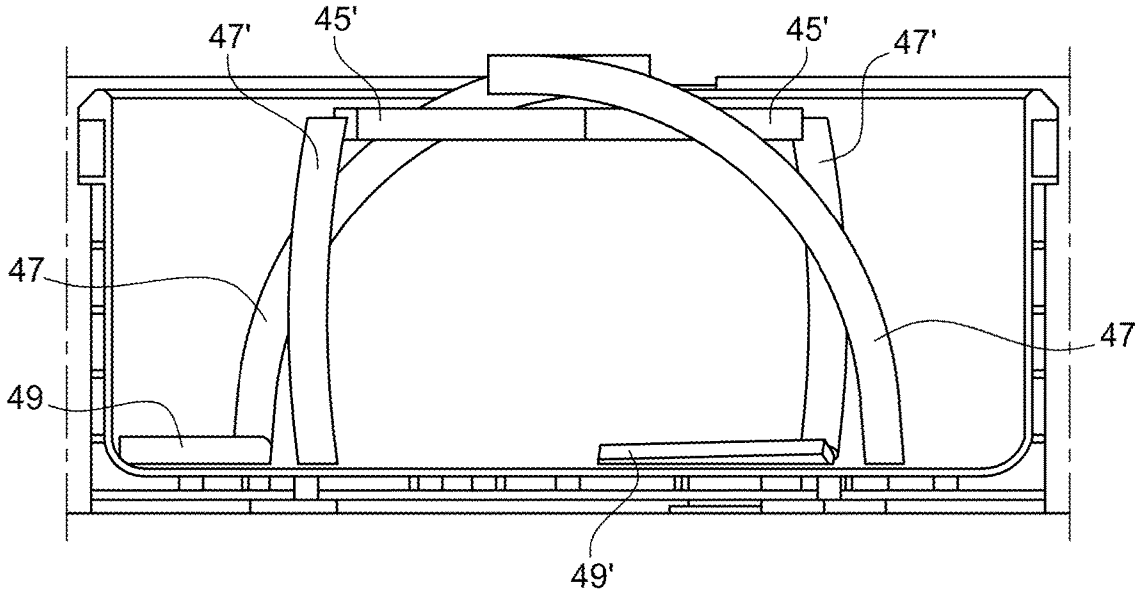

As represented in FIG. 14, the closure cover 24 further comprises an opening 59*a* for inserting ingredients into the mixing tank 23 and a cover 59*b* allowing opening or closing in an airtight manner the insertion opening 59*a*. The insertion opening allows ingredients to be added to the mixing tank 23 during a mixing operation. FIG. 15 represents a variant of the closure cap 24, in which the closure cap 24 comprises a member 59*c* for guiding the ingredients, disposed around the insertion opening 59*a*. For example, guiding member 59*c* comprises a ramp. For example, guiding member 59*c* has a funnel shape.

As represented in FIG. 14, the closure cap 24 further comprises a viewing window 61, allowing the user to carry out a visual check of the preparation during a kneading operation.

The mixing device 23 comprises a monitoring device 28 making it possible to monitor the progress of an operation of mixing a preparation. For example, the monitoring device 28 comprises a microcontroller. For example, the monitoring device 28 comprises a user interface 30. The microcontroller is configured to receive instructions from the user via user interface 30. For example, the monitoring device 28 is configured to monitor the actuator 26 of the closure cap 24 of the mixing tank 23. For example, the monitoring device 28 is configured to monitor a fluid circulation system in the space 23*c* between the inner wall 23*a* and the outer wall 23*b* of the mixing tank 23.

For example, the monitoring device 28 is configured to monitor the first and second actuation mechanisms 41, 43. In particular, the monitoring device 28 makes it possible to monitor the speed and the direction of rotation of each first and second mixing tools 25, 27. For example, the first and second actuation mechanisms 41, 43 are configured to communicate with the microcontroller by a wired link or else according to a Bluetooth® or WIFI type wireless protocol.

In particular, the monitoring device 28 can make it possible to monitor the speed and the direction of rotation of each of the first and second mixing tools 25, 27 independently of the other of the first and second mixing tools 25, 27.

For example, the monitoring device 28 comprises at least one sensor, for example a pressure sensor and/or a temperature sensor and/or a humidity sensor and/or a preparation moisture sensor. The at least one sensor is configured to transmit data to the microcontroller. For example, the at least one sensor is configured to communicate with the microcontroller according to a wireless protocol of the Bluetooth® or WIFI type.

For example, the monitoring device 28 comprises a timer connected to the microcontroller.

For example, the mixing device 13 comprises a device for injecting gas, such as nitrogen into the mixing tank 23. The gas injection device is configured to be monitored by the monitoring device 28. The gas injection device is connected to the microcontroller.

For example, the user may send an instruction via the user interface 30 to mix a preparation with a temperature rise of the preparation substantially comprised between 5 and 6 degrees Celsius for a mixing time substantially equal to 8 minutes.

For example, the user may send an instruction via the user interface 30 to mix a preparation with a hydration of the preparation substantially comprised between 45% and 80%.

The mixing tank 23 further includes a discharge opening 51 and a discharge gate 53 which is movably mounted between a discharge position in which the discharge gate 53 releases the discharge opening 51 and the content of the mixing tank 23 may be poured out of said mixing tank 23 through the discharge opening 51, and a blocking position in which the discharge gate 53 blocks the discharge opening 51 and the content of the mixing tank 23 cannot be poured out of said mixing tank 23 via the discharge opening 51. The discharge opening 51 is provided on a bottom wall of the mixing tank 23.

During a mixing and kneading operation, the discharge gate 53 is in the blocking position. When the operation is completed, the kneaded preparation is poured out through the discharge opening. The kneaded preparation may be received in a tank 55, as represented in FIG. 2. The mixing assembly 11 may also comprise a conveyor, placed under the discharge opening 51 and making it possible to collect the kneaded preparation, then to move it.

The mixing tank 23 being stationary, the installation of an discharge gate 53 on the mixing tank 23 and the discharging of the content of the mixing tank 23 are facilitated.

Although the present disclosure has been described with reference to specific embodiments, it is obvious that modifications and changes can be made to these examples without departing from the general scope of the disclosure as defined by the claims. In particular, individual features of the different illustrated/mentioned embodiments may be combined in additional embodiments. Accordingly, the description and the drawings should be considered in an illustrative rather than restrictive sense.

The invention claimed is:

1. A mixing device configured to mix a bakery preparation, a pastry preparation, or a cosmetic preparation, the mixing device comprising:

a mixing tank configured to receive ingredients intended to be mixed to form the preparation;

a first mixing tool configured to be immersed at least partially in the mixing tank and configured to mix the ingredients and/or the preparation, the first mixing tool being configured to be driven in rotation around a first axis of rotation; and a second mixing tool configured to be immersed at least partially in the mixing tank and configured to mix the ingredients and/or the preparation, the second mixing tool being configured to be driven in rotation around a second axis of rotation, the first and second axes of rotation being substantially coaxial, wherein:

the first mixing tool comprises two second parts extending towards the bottom of the mixing tank, the two second parts each having a curved shape, and a third part extending radially towards the outside of the mixing tank and connected to one of the two second parts, and the second mixing tool comprises two second parts extending towards the bottom of the mixing tank, the two second parts each having a curved shape, and a third part extending radially towards the outside of the mixing tank and connected to one of the two second parts, wherein:

the first mixing tool comprises two first parts, extending in the radial direction relative to the first and second axes of rotation outwards, each of the two first parts being connected to a respective one of the second parts of the first mixing tool, the two first parts extending oppositely in the radial direction, and the second mixing tool comprises two first parts, extending in the radial direction with respect to the first and second axes of rotation outwards, each of the two first parts being connected to a respective one of the second parts of the second mixing tool.

2. The mixing device according to claim 1, further comprising a first drive mechanism configured to drive the first mixing tool in rotation around the first axis of rotation, and a second drive mechanism configured to drive the second mixing tool in rotation around the second axis of rotation, wherein the first mixing tool and the second mixing tool are configured to be driven in rotation in the same direction of rotation or according to two opposite directions of rotation.

3. The mixing device according to claim 2, wherein the first drive mechanism is configured to directly drive the first mixing tool in rotation, and the second mechanism drive is configured to directly drive the second mixing tool in rotation.

4. The mixing device according to claim 2, wherein the first mixing tool comprises a first drive portion configured to be driven in rotation around the first axis of rotation by the first drive mechanism, and the second mixing tool comprises a second drive portion, configured to be driven in rotation around the second axis of rotation by the second drive mechanism, the first drive portion being disposed around the second drive portion.

5. The mixing device according to claim 1, wherein at least one of the first and second mixing parts comprises a rectilinear portion, and/or wherein at least one of the first and second mixing parts comprises a curved portion, and/or at least one of the first and second mixing parts comprises a portion extending in an axial direction with respect to the first and second axes of rotation respectively, and/or wherein at least one of the first and second mixing parts comprises a portion inclined with respect to an axial direction with respect to the first and second axes of rotation, and/or wherein at least one of the first and second mixing parts comprises an offset portion configured to form a passage for the preparation between the first and second mixing parts.

6. The mixing device according to claim 1, wherein at least one of the first and second mixing tools comprises a scraping part extending in a radial direction with respect to the first and second axes of rotation and being adjacent to the bottom of the mixing tank.

7. The mixing device according to claim 1, wherein the curved shape of each of the two second parts of the first mixing tool extends at a constant radial distance from the first axis of rotation, and wherein the curved shape of each of the two second parts of the second mixing tool extends at a constant radial distance from the second axis of rotation.

8. The mixing device according to claim 1, wherein:

the third part of the first mixing tool comprises two upper surfaces, facing the top of the tank, wherein the two upper surfaces have different inclinations, and a lower surface facing the bottom of the tank, the two upper surfaces and the lower surface being arranged such that the third part has a triangular section, and the third part of the second mixing tool comprises an upper surface, facing the top of the tank, and a lower surface facing the bottom of the tank, wherein the upper surface and the lower surface have the same inclination.

9. The mixing device according to claim 1, wherein the mixing tank comprises a side wall having the shape of a right circular cylinder.

10. The mixing device according to claim 1, wherein the mixing tank includes a discharge opening, and a discharge gate which is movably mounted between a discharge position in which the gate releases the discharge opening and the content of the mixing tank may be poured out of the mixing tank through the discharge opening, and a blocking position in which the discharge gate blocks the discharge opening.

11. The mixing device according to claim 1, further comprising a closure cap configured to close in an airtight manner the mixing tank.

12. A mixing assembly comprising a mixing device according to claim 1, and a frame, the mixing tank of the mixing device being configured to be mounted on a frame, the mixing tank being stationary relative to the frame.

* * * * *